Feb. 6, 1951 B. C. COOK ET AL 2,540,934
HOPPER FEED MEANS FOR FASTENER DRIVING MACHINES
Filed July 15, 1949 5 Sheets-Sheet 3
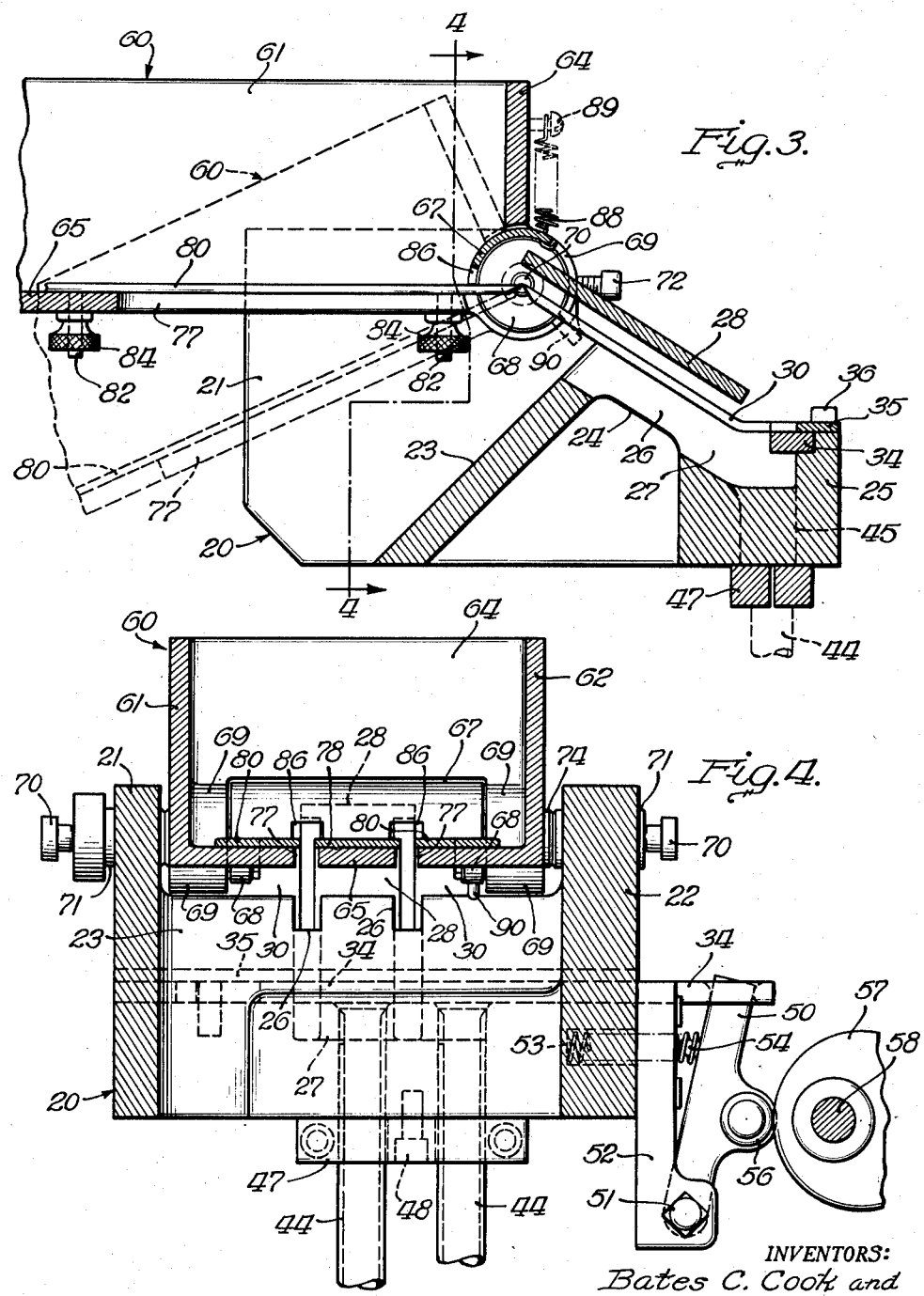
INVENTORS:
Bates C. Cook and
John Jokubonis
BY: Brown Jackson Boettcher & Dienner
Attys.

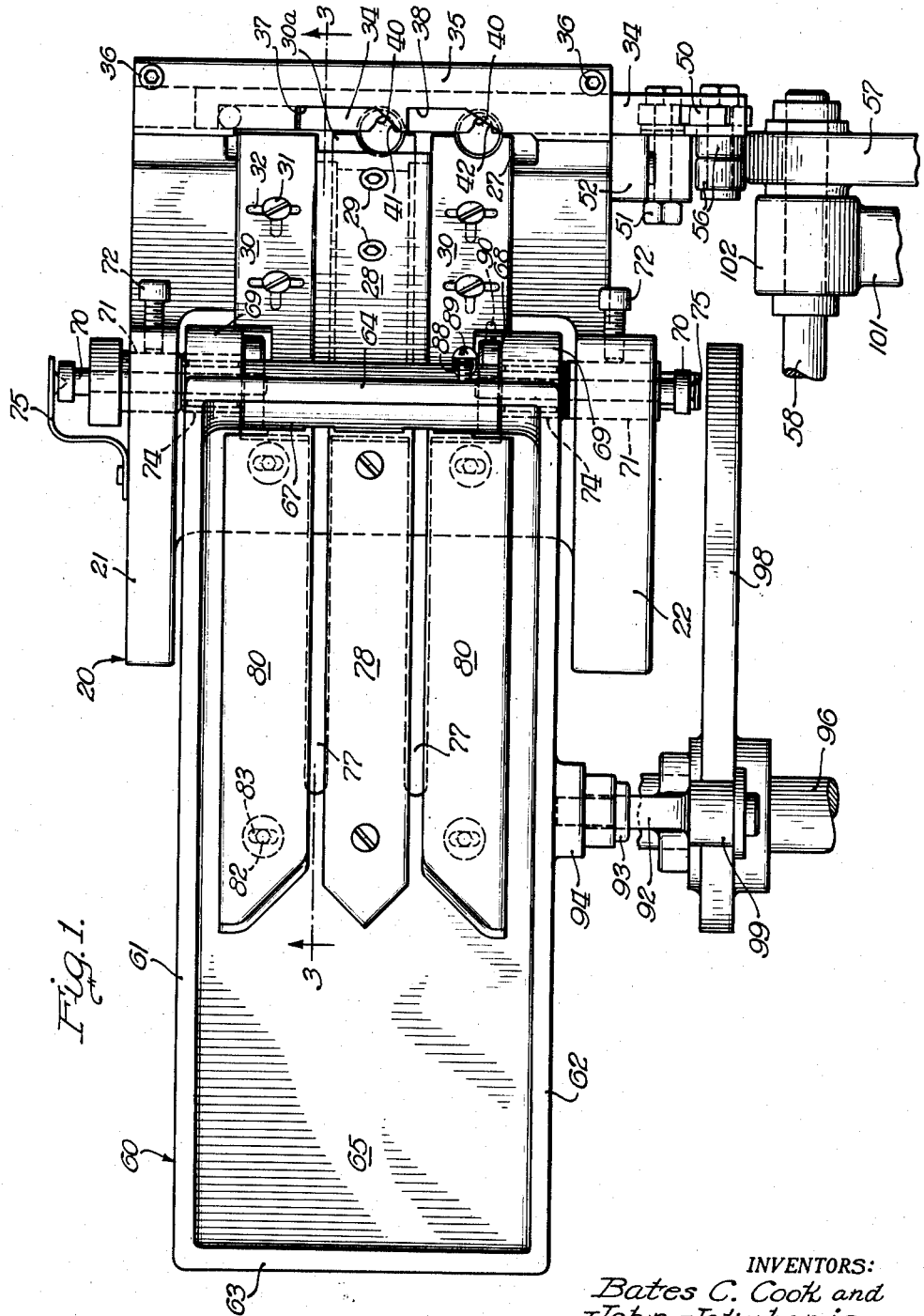

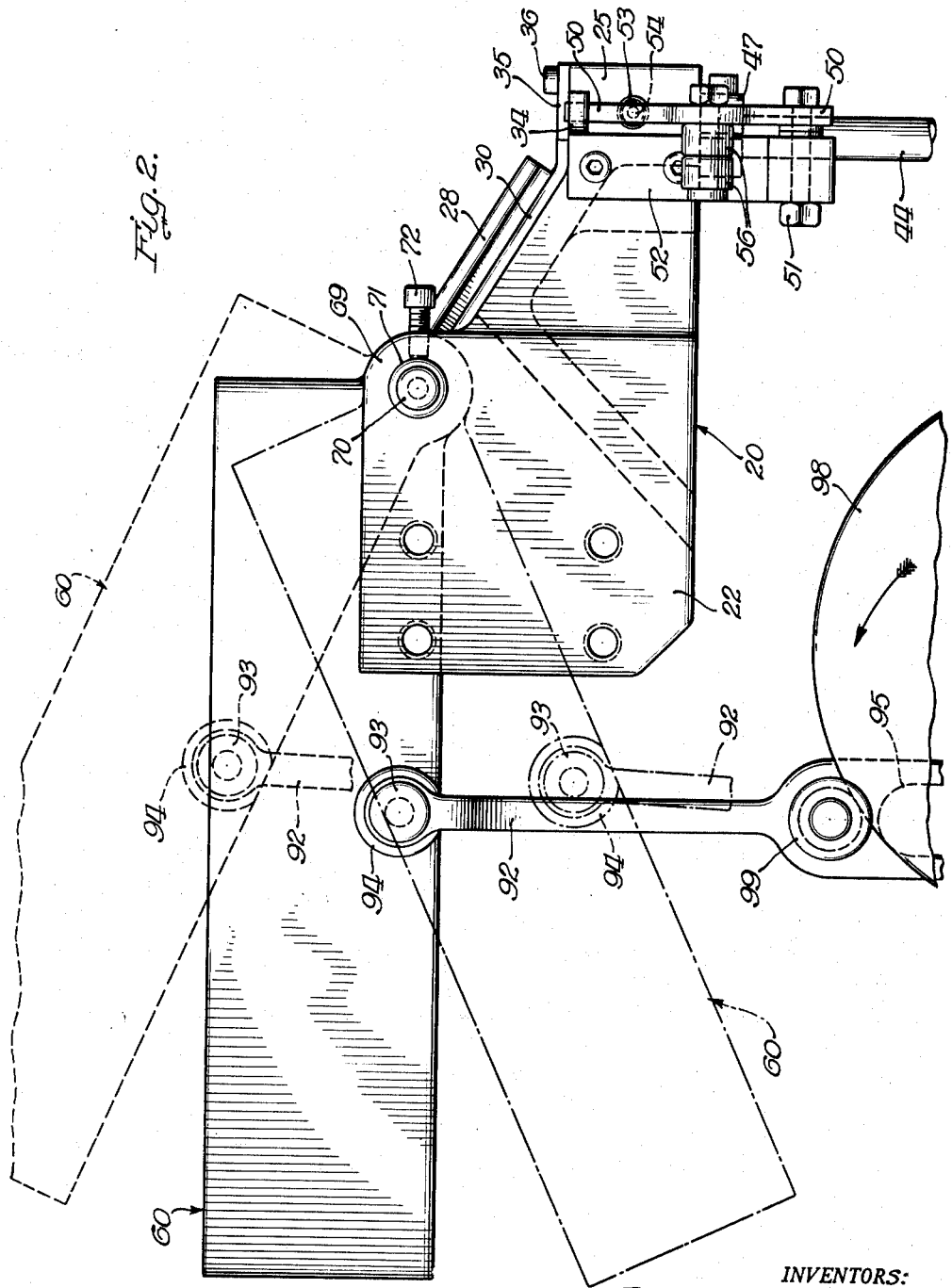

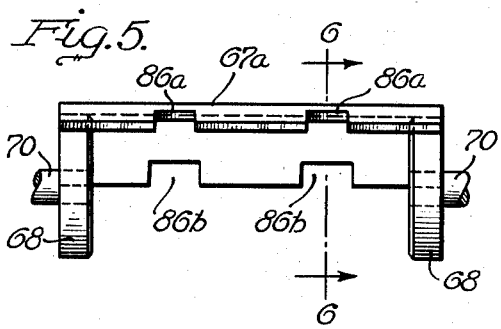
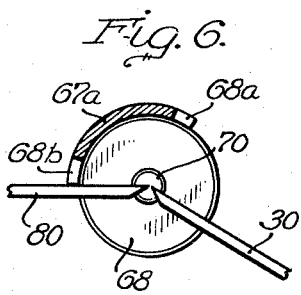
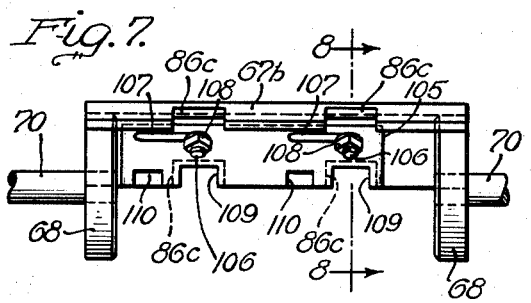
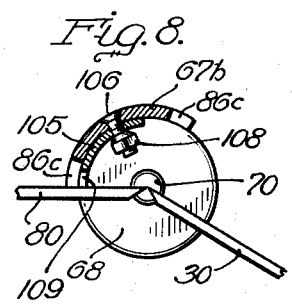
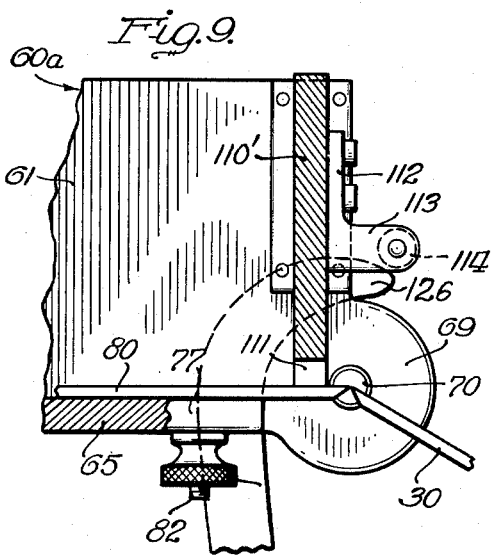
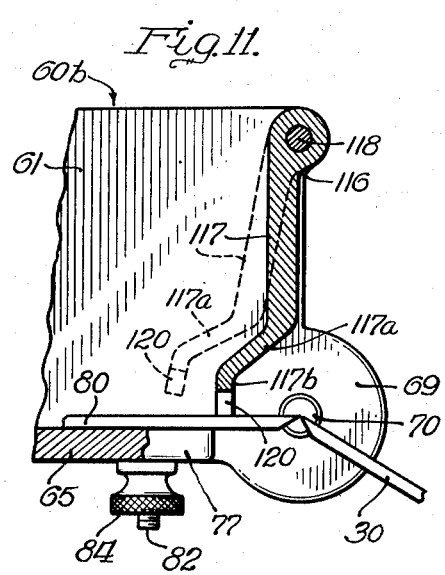
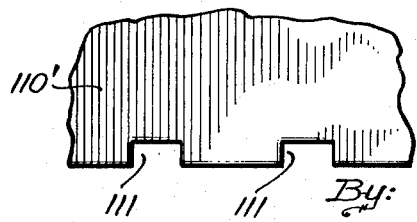

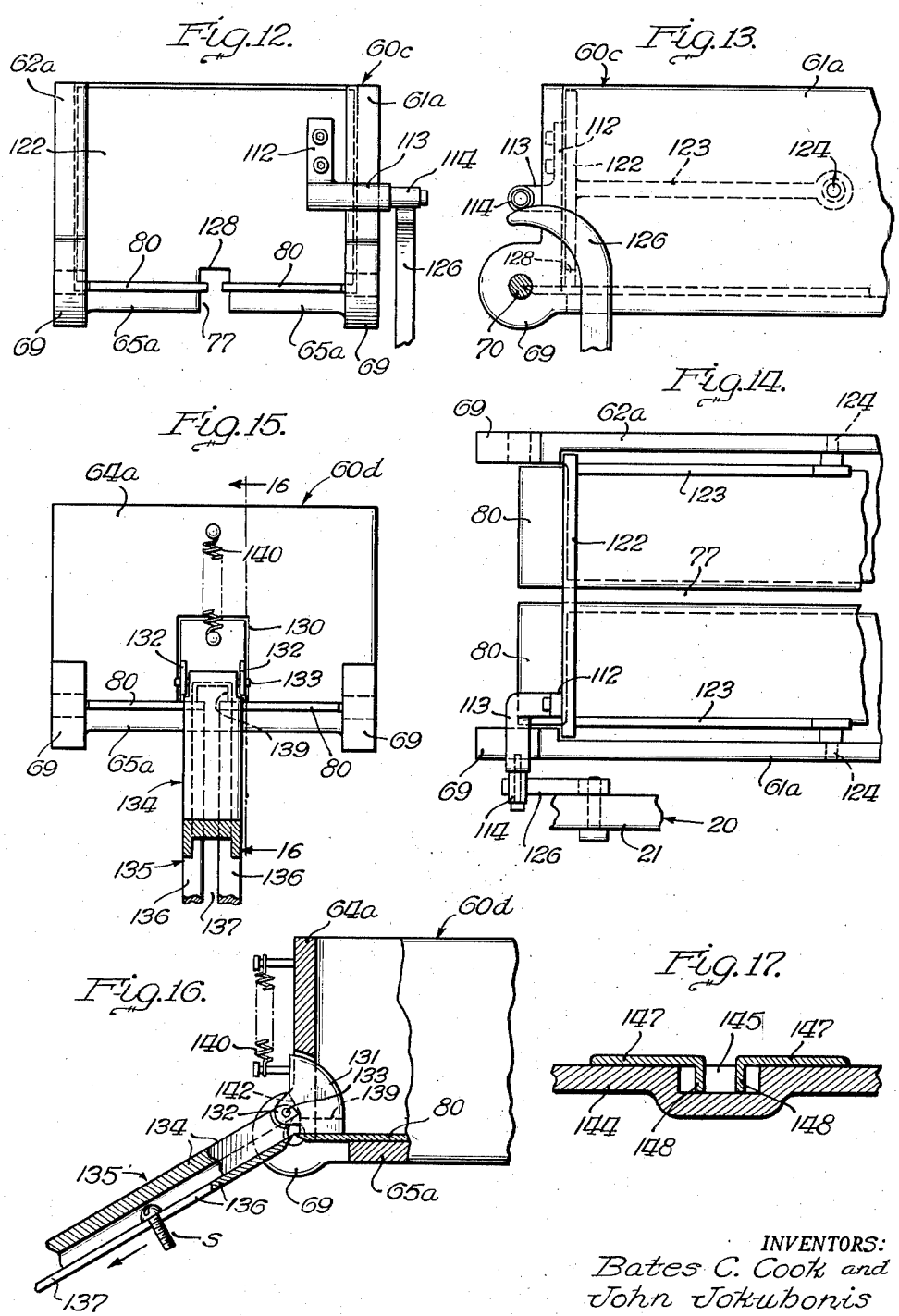

Patented Feb. 6, 1951

2,540,934

UNITED STATES PATENT OFFICE 2,540,934

HOPPER FEED MEANS FOR FASTENER DRIVING MACHINES

Bates C. Cook and John Jokubonis, Chicago, Ill., assignors to Cook & Chick Company, Chicago, Ill., a corporation of Illinois Application July 15, 1949, Serial No. 105,008

14 Claims. (Cl. 10—164)

This invention relates to feed hopper means for use with screw driving machines, nailing machines and various other machines of like character, and has to do with self clearing feed hopper means.

It is known to provide oscillatory feed hoppers for delivering screws, nails and other articles to reserve tracks of screw driving and analogous machines, from which tracks the articles are delivered to chucks or holding devices effective for holding the articles in proper position to be acted upon by the screw driver of a screw driving machine, the hammer of a nailing machine, or analogous devices. The known feed hoppers referred to are of box like formation with lengthwise slots in their bottom walls and notches in an end wall, through which the articles are delivered from the hopper to the reserve tracks. The articles, such as screws, nails, rivets, nuts, etc. are dumped into the hopper the oscillatory movement of which causes the articles to be positioned in the slots and to be delivered therefrom, through the notches in the end wall, to the reserve tracks. It frequently happens that the articles become jammed in the slots, particularly at the notches in the end wall of the hopper, thereby necessitating stopping of the machine and clearing of the slots and notches in order that delivery of articles from the hopper to the tracks may be resumed. That is objectionable, for obvious reasons.

Our invention is directed to feed hopper means of the character above referred to which is self clearing and effectively prevents jamming, thereby avoiding the above mentioned objections to the present type of feed hopper means. More particularly, we provide a feed hopper adapted to be oscillated about a substantially horizontal axis adjacent the upper end of the inclined reserve tracks, this hopper having, adjacent its track end, gate means closed in the movement of the hopper to an upper position in which it is inclined downward toward the tracks, the gate means being open during movement of the hopper from an approximately horizontal position downward to a lower position in which it is inclined downward away from the tracks, whereby articles which may have become jammed in the notches of the gate means are released and fall downward toward the then lower end of the hopper, thereby clearing the gate means and the slots. In that manner jamming of the articles in the slots or the gate means is effectively prevented, rendering possible continuous operation of the feed hopper means and uninterrupted operation of the screw driving, nailing, rivet setting or other associated machine, which is conducive to efficient operation of the machine and corresponding increase in output. Further objects and advantages of our invention will appear from the detail description.

In the drawings:

Figure 1 is a plan view of feed hopper means embodying our invention, and associated parts, certain parts being broken away;

Figure 2 is a side view of the feed hopper means of Figure 1, and associated parts;

Figure 3 is a sectional view taken substantially on line 3—3 of Figure 1;

Figure 4 is a sectional view taken substantially on line 4—4 of Figure 3;

Figure 5 is an elevational view of the feed gate, on an enlarged scale, as seen from the delivery end of the hopper, the pivot pins for the gate being shown fragmentarily and broken away;

Figure 6 is a sectional view taken substantially on line 6—6 of Figure 5, this view showing also the guide strips of the hopper bottom and the article reserve track, these strips being broken away.

Figure 7 is a view similar to Figure 5 but showing a modified form of gate;

Figure 8 is a view similar to Figure 6 taken substantially on line 8—8 of Figure 7, certain parts being shown in elevation;

Figure 9 is a lengthwise vertical sectional view of the delivery end portion of a modified form of hopper and a modified form of gate therefor, this view showing also guide strips on the bottom wall of the hopper and for the article reserve track, these strips being broken away;

Figure 10 is a fragmentary innerface view of the gate of Figure 9;

Figure 11 is a view similar to Figure 9 but showing a second modified form of hopper and a third modified form of gate;

Figure 12 is a delivery end view, on a reduced scale, of a third modified form of hopper and a fourth modified form of gate and gate opening means therefor;

Figure 13 is a side view, partly broken away, of the hopper and gate and associated parts of Figure 12;

Figure 14 is a plan view of the hopper and gate and associated parts of Figures 12 and 13;

Figure 15 is a view similar to Figure 12 but showing a fourth modified form of hopper and a fifth modified form of gate therefor, this view also showing fragmentarily an article reserve track;

Figure 16 is a side view, partly broken away and in section, of the hopper and gate and associated parts taken substantially on line 16—16 of Figure 15; and Figure 17 is a fragmentary transverse vertical sectional view through the bottom wall of a further modified form of hopper, this view showing also guide strips on the bottom wall and being on an enlarged scale relative to Figure 16.

In Figures 1 to 4, inclusive, we have shown a mounting bracket 20 of generally rectangular shape in plan, comprising spaced side walls 21 and 22 connected by a cross web 23 extending downward from the upper end of a cross web 24, formed integrally with web 23 and inclined oppositely thereto. The web 24 extends downward at an inclination to a relatively thick cross bar 25 integral therewith and with the side walls 21 and 22. Web 24 is provided with two spaced parallel slots 26 opening, at their upper ends, through web 23 and, at their lower ends, into recesses 27 in bar 25. This bar 25 is disposed at what may be considered for purposes of description, the forward end of bracket 20. It will be seen that the web 23 is inclined upward and forwardly of bracket 20 and web 24 is inclined forwardly and downwardly of bracket 20 to bar 25. A track cover 28, of T cross section, is suitably secured, conveniently by socket headed screws 29, to the portion of web 24 between the slots 26 therein. Two guide strips 30 are secured on the upperface of web 24 adjacent to and at the outer sides of slots 26, by screws 31 passing through transverse slots 32 in the strips 30. It will be seen that the strips 30 may be adjusted transversely for varying the effective width of the respective slots 26. The web 24 provides, in conjunction with the slots 26 and associated parts, downwardly and forwardly inclined reserve tracks for articles delivered thereto from the feed hopper as will be explained more fully later.

The cross bar 25 is suitably recessed from its upperface for reception of a picker bar 34 slidably mounted therein for reciprocating movement. This bar 34 is restrained against upward movement by a cover plate 35 suitably secured to cross bar 35 conveniently by socket headed screws 36, and overlying bar 34. Plate 36 is provided, at its inner or rearward edge, with two elongated notches 37 and 38 overlying the inner or rearward portion of bar 34. When this bar 34 is in its outer position shown in Figure 1, two arcuate notches 40, opening through its rearward edge, are disposed in underlying relation to two inclined surfaces 41 and 42 of cover plate 35 at the outer ends of the elongated notches 37 and 38, respectively, thereof. Also, when bar 34 is in its outer position the arcuate recesses or notches 40 therein overlie the upper ends of delivery tubes 44 extending into bores or pockets 45 in bar 25, opening into recesses 27. The tubes 44 are secured in the split ends of a clamp lock 47 suitably secured, conveniently by socket head screws, one of which is shown at 48, to the underface of cross bar 25.

The side wall 22 of bracket 20 is suitably bored and tapped for bolting to a suitable support on a screw driving or analogous machine. The picker bar 34 is provided with a slot through its outer end, which slot receives the upper end of an arm 50 pivoted at its lower, at 51, on a bracket 52 bolted to side wall 22 of bracket 20. The arm 50 is urged outward by the compression spring 53 seating in a recess in side wall 22 of bracket 20, the outer end portion of spring 53 seating about a stud 54 carried by arm 50. A roller 56 is mounted on arm 50 and is disposed for contact by an eccentric 57 fixed on a shaft 58 rotated in any suitable manner at appropriate speed. It will be seen that when the shaft 58 is rotated, the picker bar 34 is reciprocated. When the bar 34 is moved to its inner position, the arcuate notches 40 thereof are aligned with the article reserve tracks and the lowermost article in each of such tracks passes, by gravity, into a recess or notch 40 of bar 34. As the bar 34 moves outward the articles are retained in the recesses or notches 40, by the lower or forward ends of the strips 30 and an intermediate strip 30ª disposed in underlying relation to the track cover 28, the lower or forward edges of these strips being disposed in close proximity to the inner or rearward edge of bar 34. As is shown more clearly in Figure 1, the intermediate strip 30ª and one of the strips 30 are notched out at their lower ends to provide arcuate notches or recesses therein overlying and conforming to recesses or pockets 45 in bar 25. In the continued outward movement of feed bar 34, the articles are displaced, by the inclined surfaces 41 and 42 of cover plate 35, from the notches 40 in bar 34 and dropped downward into the tubes 44, by means of which the articles are delivered to the chucks or other holding devices of the associated machine. The article reserve tracks and the means for feeding the articles therefrom to the delivery tubes 44 are, in general, of known construction and operation and are illustrative of one form of arrangement suitable for use with the feed hopper means of our invention. Within the broader aspects of our invention, any suitable article reserve track and feed means may be provided for delivering the articles from the hopper to the chucks or holding devices of the associated screw driving, nailing or other machine.

We have illustrated our invention, by way of example, as applied to a hopper 60 of oblong shape in plan, comprising side walls 61 and 62, end walls 63 and 64 and a bottom wall 65. The end wall 64 is spaced a material distance above the bottom wall 65, as is shown more clearly in Figures 3 and 4. A gate 67, of arcuate cross section, is disposed at the track or delivery end of the hopper 60, in underlying relation to the forward or feed end wall 64 thereof. Gate 67 is provided, at each end, with a cylindrical end wall or boss 68. The bosses 68 fit between cylindrical bosses 69 at the forward lower corners of hopper 60. Shouldered pivot pins 70 are inserted through bushings 71 suitably secured, conveniently by set screws 72, in the side walls 21 and 22 of the mounting bracket 20. The pins 70 extend through bushings 74 in bosses 69 and also extend through the cylindrical heads or bosses 68 at the ends of gate 67. It will be seen that the pins 70 provide common means for pivotally mounting the hopper 60 and the gate 67 for movement about a horizontal axis at the upper end of the article reserve tracks. In that connection, it will be noted that the guide strips 30 and 30a of the tracks extend upward and rearward to the axis of pins 70, as shown more clearly in Figure 3. It will also be understood that the gate 67 and the hopper 60 have relative movement about the common axis of the pins 70. Preferably, suitable means is provided for guarding against accidental withdrawal of the pins 70. Such means may take the form of suitably shaped leaf spring members 75 (Fig. 1) pivoted on the walls 21 and 22 of bracket 20 and normally bearing on the heads of pins 70, the members 15 having rounded projections pressed therefrom and engaging in corresponding recesses in the heads of the pins. Any suitable means may be provided for guarding against accidental withdrawal of the pins 70.

The bottom wall 65 of hopper 60 is provided with two lengthwise slots 77 opening through its track end. A guide strip 78 is secured to the upperface of bottom wall 65 between the slots 77 and may project a slight distance thereover. Guide strips 80 are mounted on the upperface of bottom wall 65 at the outer sides of slots 77, each of the strips 80 being provided with a screw stud 82 fixed thereto, a short distance from each end thereof, and extending through the transverse slot 83 in bottom wall 65. Thumb nuts 84, threaded on studs 82, engage the underface of bottom wall 65 for clamping the guide strips 80 in adjustment. The guide strips 78 and 80 constitute, in effect, parts of bottom wall 65 of hopper 60 and provide forward extensions of bottom wall 65, as will be clear from what has been said. It will be seen that guide strips 80 provide, in conjunction with the guide strips 78, upward extensions of the slots 77 while also providing means whereby the effective width of such slots may be adjusted. Accordingly, the slots in the bottom wall 65 of the hopper 60 may be adjusted and the slots of the article reserve tracks may also be adjusted, in the manner previously described, to accommodate articles of various sizes. As is shown more clearly in Figure 3, the strips 78 and 80 extend forwardly beyond the bottom wall 65 into close proximity to the upper ends of the strips 30 and 30ª of the article reserve tracks. The strips 78 and 80 thus constitute extensions of the bottom wall 65 of the hopper and also define upward extensions of the slots 77, as will be clear.

The gate 67 is provided with two notches 86 extending from its rearward or lower edge and of appropriate width to straddle the slots 77 in bottom wall 65, particularly the upper portions of the slots defined by the guide strips 78 and 80, as is shown more clearly in Figure 4. Gate 67 is urged in counterclockwise direction, as viewed in Figure 3, by a tension spring 88 anchored at its lower end to the forward portion of gate 67 and, at its upper end to a screw 89 secured in end wall 64 of the hopper. Counterclockwise turning of gate 67 is limited by a pin 90 secured in one of the heads 68 thereof and disposed to contact the underface of the adjacent track guide strip 30, it being noted that the strips 30 are notched out at their upper portions to accommodate bosses 69 and the bosses or heads 68 of gate 67. When the hopper 60 is in its horizontal position, shown in Figures 3 and 4, the lower edge of gate 67 is in contact with the guide strips 78 and 80 extending from the forward end of bottom wall 65 of the hopper 60, with the notches 86 straddling the slots 77, including the upper portions thereof defined by the strips 78 and 80.

It may be assumed, for purposes of description, that headed screws, such as the screw s shown in Figure 16, are to be delivered by the hopper 60 to the tracks. The screws are dumped in bulk into the hopper 60 and the latter is oscillated about the axis of pins 70 for delivering the screws to the tracks. Any suitable means may be provided for oscillating the hopper 60. In Figures 1 and 2, we have shown a pitman rod 92 pivoted at its upper end, by a screw 93, to a boss 94 integral with side wall 62 of hopper 60. The lower portion of pitman 92 is of increased width and is provided with a lengthwise slot 95 receiving a shaft 96 rotated in a suitable manner at appropriate speed. And eccentric cam 98 is fixed on shaft 96 in underlying relation to a flanged roller 99 mounted on a pitman 92 and bearing on cam 98. When the shaft 96 is rotated, the pitman 92 will be reciprocated vertically and will swing the hopper 60 about the axis of pins 70 to an upper position, indicated in dotted lines in Figure 2, in which the hopper is inclined downward to the article reserve tracks, and a lower position indicated in dot and dash lines in Figure 2, in which the hopper inclined downward from the axis of pins 70.

As will be understood, this oscillatory movement of the hopper shifts the screws therein back and forth lengthwise thereof, and certain of the screws pass through the slots 77, including the portions of such slots defined by the strips 78 and 80, and are suspended by their heads in the slots with the screws in each of such slots in alignment lengthwise of the bottom wall 65 of the hopper 60. As previously explained, when the hopper 60 is in horizontal position, the gate 67 is closed with the notches 86 thereof straddling the slots in the bottom wall of the hopper. During upward movement of the hopper from horizontal position to its upper position, the gate 67 turns with the hopper about the common axis of the pins 70. This upward movement of the hopper 60 causes the screws in the slots in the bottom wall 65 thereof to move forward and pass into the upper ends of the article reserve tracks, thereby replenishing the reserve articles in such tracks as required. Since the gate is closed during such upward movement of the hopper 60, only those screws in the slots in the bottom wall of the hopper can pass from the hopper to the reserve tracks. As the hopper approaches the limit of its upward movement, the screws therein not disposed in the slots in the bottom wall of the hopper will move forward to the gate 67 and some of the screws may pass part way through the notches 86 of gate 67, it being understood that these notches are of such size as to preclude possibility of a screw passing completely therethrough except such screws as are suspended in the slots in the bottom wall of the hopper. The screws passing part way through the slots 86 of the gate 67 would, unless promptly removed therefrom, cause jamming of the screws in the slots of the bottom wall of the hopper thus preventing proper feed of screws from the hopper to the reserve tracks. In the downward movement of hopper 60 from its upper position, the gate 67 turns with the hopper about the pins 70 until the hopper reaches horizontal position. When that occurs, the gate 67 is restrained against further movement with the hopper by the pin 90, as above explained. In the downward movement of hopper 60 from horizontal position, gate 67 remains stationary and the bottom wall 65 of the hopper moves downward away from gate 67 which, in the lower position of the hopper, is spaced a material distance above bottom wall 65 of hopper 60. The gate 67 is thus, in effect, opened during the downward movement of hopper 60 from approximately horizontal position and any articles which have lodged in the notches 86 of gate 67 are thereby released and move by gravity to the then lower end of the hopper. In that manner the hopper is rendered self clearing and jamming of the articles, such as would interfere with proper feed thereof to the reserve tracks, is effectively guarded against.

In Figure 1 we have shown a suitable support 101 and bearing sleeve 102 for the shaft 58. It will be understood that any suitable means may be provided for mounting and rotating shaft 58, and the shaft 96 may also be mounted and rotated in any suitable manner. Also, any suitable means may be provided for oscillating the hopper 60.

The gate 67a shown in Figures 5 and 6 is similar to the gate 67 except that it is provided at one side with two notches 86a and, at its other side, with two notches 86b of greater extent lengthwise of the gate than the notches 86a. This gate 67a may be reversed to use either notches 86a or 86b, thereby providing for the effective feeding of articles of different sizes.

The gate 67b of Figures 7 and 8 is provided, at each side thereof, with two notches 86c, which may all be of the same size. An arcuate plate 105 is mounted on gate 67b at the inner face thereof, by screws 106 having their heads countersunk in gate 67b, these screws 106 passing through lengthwise slots 107 in plate 105 and receiving nuts 108 for clamping plate 105 in adjustment. This plate 105 is provided, in one edge thereof, with two sets of notches 109 and 110, the notches of each set being of different extent than those of the other set. In one position of plate 105, shown in Figure 7, the notches 109 thereof are aligned with the notches 86c of gate 67b, it being noted that the notches 109 are smaller than notches 86c. By moving the plate 105 lengthwise, as permitted by slots 107, into its other position, the notches 110 of plate 105 may be aligned with notches 86c of gate 67b, thus providing notches materially smaller than the notches 86c. Gate 67b, like gate 67a of Figures 5 and 6, is reversible to use the notches 86b at either side of gate 67b, or the notches 110 of plate 105 at one side of gate 67b, when plate 105 is positioned with notches 110 thereof aligned with the notches 86c at the corresponding side of gate 67b as above explained. It will be seen that by providing the adjustable plate 105 with the notches therein arranged as stated, the gate 67b may be utilized for controlling delivery from the hopper of articles within the range of the three sizes provided for by the notches in plate 105 and the notches in gate 67b.

In Figure 9 the hopper 60a is similar to the hopper 60 of Figures 1 to 4, inclusive, except that the delivery and wall 64 of the latter hopper is omitted. A gate 110 is slidably mounted, for movement toward and away from bottom wall 65 of the hopper, in guide ways or grooves formed in the side walls of the hopper. This gate is provided, in its lower edge, with two notches 111 disposed to straddle the slots in the bottom wall 65, when gate 110 is in its closed position. A bracket 112 is bolted to the gate 110, at the outerface thereof, this bracket being provided with arm 113 which extends outwardly across and beyond the side wall 61 of hopper 60a. A roller 114 is mounted on arm 113 and is disposed for contact with a cam member 126 secured to and extending upward from the side wall of the mounting bracket 20. When the hopper 60a is in its horizontal position shown in Figure 9, gate 110 is in its closed position in close proximity to the extension of bottom wall 65 of the hopper, provided by the guide strips 78 and 80. During upward movement of the hopper 60 from approximately horizontal position to its upper position, the gate 110 remains closed and the articles are delivered from the hopper 60a to the tracks in the manner previously described. During the downward movement of hopper 60a from approximately horizontal position, the gate is restrained against downward movement, so that the bottom wall 65 of the hopper moves downward away from the gate so as to be spaced a material distance therefrom, thus releasing any articles which have become jammed in the notches 111, such articles moving downward by gravity to the then lower end of the hopper. That renders the hopper self clearing and effectively prevents jamming, as previously described. As will be understood, the gate 110 provides a closure member or wall at the delivery end of the hopper.

In Figure 11 the hopper 60b is similar to the hopper 60a of Figure 9, except that it is provided, at its upper delivery end corners, with forwardly projecting ears 116. A gate 117 is pivotally mounted at its upper end, at 118, between the ears 116 and provides a closure member or wall at the delivery end of the hopper. This gate 117 is provided with a downwardly and rearwardly inclined lower portion 117a, from which extends a flange 117b. This flange 117b is provided with two notches, one of which is shown at 120. In the closed position of gate 117 shown in Figure 11, the notches 120 straddle the slots in the bottom wall 65 of hopper 60b, the lower edge of gate 117 then resting upon the extension of the bottom wall 64 provided by the guide strips 78 and 80. During upward movement of the hopper 60b from approximately horizontal position to its upper position, the gate 117 remains closed and the articles are delivered from the hopper through the notches 120 to the tracks in the manner previously described. During downward movement of hopper 60b from horizontal position to its lower position about pin 70 as an axis, gate 117 swings rearwardly into approximately its dotted line position of Figure 11, being then spaced a substantial distance above the bottom wall of the hopper so as to free any articles which have become jammed or caught in the notches 120. That renders the hopper self clearing with the advantages above referred to.

The hopper 60c of Figures 12 to 14, inclusive, is, in general, similar to the hopper of Figures 9 and 10, but is provided with but one slot 77 in its bottom wall 65a. A gate 122 is disposed at the delivery end of the hopper and constitutes the delivery end wall thereof. This gate is provided with rearwardly extending arms 123 pivoted at their rearward ends at 124, to the side walls 61a and 62a of hopper 60c. A bracket 112 is bolted to gate 122, at the outerface thereof and adjacent side wall 61a of hopper 60c. This bracket 112 is provided with an arm 113 extending therefrom outwardly beyond side wall 61a of hopper 60c. A roller 114 is mounted on arm 113 and is disposed for contact with a cam member 126 bolted to and extending upward from side wall 21 of the mounting bracket 20. Gate 122 is provided, in its lower portion, with a notch 128 which, in the closed position of gate 122, straddles slot 77. The roller 114 and cam member 126 are so disposed that gate 122 is in its lowered or closed position when the hopper 60c is in horizontal position, as shown in Figure 13. During movement of the hopper 60c from approximately horizontal position to its upper position, the gate 112 remains closed and the articles are delivered from the hopper through slot 77 and notch 128 to the article reserve tracks, in the manner previously described. During the downward movement of hopper 60c from approximately horizontal position to its lower position, gate 122 is restrained against downward movement, the cam 126 being appropriately formed to that end, so that the bottom wall 65a of hopper 60c moves away from the gate and is spaced a material distance therefrom in the lower position of the hopper 60c. Accordingly, during the downward movement of hopper 60c from approximately horizontal position, any articles which may have become jammed or caught in the notch of gate 122 are released and moved downward by gravity toward the then lower end of the hopper 60c. That renders the hopper self clearing and effectively guards against jamming, with the advantages above noted. Referring further to Figure 9, the gate 110 thereof is controlled by a cam member in the same manner as the gate 122 of Figures 12 to 14, inclusive, as will be readily understood from what has previously been said.

In Figures 15 and 16, the delivery end wall 64a of hopper 60d is provided with a rectangular opening 130. A gate 131 of generally arcuate cross section is disposed in opening 130, this gate 131 being provided with forwardly extending ears 132 receiving a pivot pin 133 passing through the upper end of a track cover 134, of channel cross section, of an article reserve track 135. This track 135 comprises guide strips 136 defining between them a slot 137 aligned with the slot in bottom wall 65a of hopper 60d defined in part by the guide strips 80. The gate 131 is provided, in its lower portion, with a notch or channel 139 which overlies and straddles the slot in the bottom wall 65a of hopper 60d, when gate 131 is in its closed position shown in Figure 16. A tension spring 140, anchored at its lower end to gate 131 and at its upper end to wall 64a, yieldingly urges gate 131 clockwise, as viewed in Figure 16, to its position shown. Turning movement of gate 131 in clockwise direction is limited by a stop element 142 thereof disposed to contact the upper end of track cover 134. When the hopper 60d is in horizontal position the gate 131 is closed with its lower edge in close proximity to the forward extension of bottom wall 65a, provided by the guide strips 80. During the upward movement of hopper 60d from approximately horizontal position to its upper position, the articles are delivered therefrom through the notch or channel 139 in gate 131 to the track 135. In the downward movement of hopper 60d from approximately horizontal position to its lower position, the gate 131 remains stationary and the bottom wall of the hopper moves downward away from the gate so as to be spaced a material distance therefrom when the hopper 60d is in its lower position. That releases any of the articles which may have entered the notch or channel 139 without being properly positioned in the slot in the bottom wall 65a of hopper 60a, and such articles move by gravity toward the then lower end of hopper 60d. That renders the hopper self clearing and effectively guards against jamming of articles in the gate or between the same and the bottom wall of the hopper, with the advantages above pointed out.

In the preceding description it has been assumed that the articles being handled are headed articles, such as screws, nails and the like. When handling unheaded articles, such as nuts or headless rivets, or other articles without pronounced heads or shoulders on them, the slot or slots in the bottom wall of the hopper should be closed. In Figure 17 we have shown in fragmentary cross section a bottom wall 144 of a hopper which may be similar to any one of the hoppers previously described. This bottom wall 144 is provided with an upwardly opening slot or groove 145 extending lengthwise thereof and closed at its underside. Guide strips 147 are mounted on the upper face of bottom wall 144 for adjustment toward and away from each other in the same manner as the guide strips 80 of Figures 1 to 4, inclusive. Each of the guide strips 147 is provided with a flange 148 extending downward in the slot or channel 145 and defining between them a slot having an effective width determined by the adjustment of the guide strips 147. By thus closing the bottom of the slot or channel in the bottom wall of the hopper, the hopper may be used for delivering unheaded articles to the article reserve track. While we have shown herein hoppers for delivering articles to two article reserve tracks, and hoppers for delivering articles to one article reserve track, it will be understood that by varying the number of slots or channels in the hopper bottom the hopper may be adapted for delivering articles to any desired number of article reserve tracks which may be practicable.

As above indicated, and as will be understood by those familiar with hopper feed devices, changes in detail may be resorted to without departing from the field and scope of our invention, and we intend to include all such variations, as fall within the scope of the appended claims, in this application in which the preferred forms only of our invention have been disclosed.

We claim:

1. In feed hopper means of the character described, article receiving reserve tracks, a hopper mounted for oscillatory movement about a substantially horizontal axis, means for oscillating said hopper effective for moving it to an upper position and a lower position in which it is respectively inclined downwardly toward and away from said tracks, said hopper having a bottom wall provided with lengthwise slots disposed to deliver articles therein to said tracks when said hopper is in its said upper position, a gate mounted adjacent said tracks yieldingly urged closed toward said bottom wall, and means limiting downward movement of said gate in the downward movement of said hopper whereby said gate remains open with its bottom spaced from the bottom wall of said hopper when the latter is moved to its said lower position.

2. In feed hopper means of the character described, article receiving tracks, a hopper mounted for oscillatory movement about a substantially horizontal axis, means for oscillating said hopper effective for moving it to a first position inclined downwardly toward said tracks and a second position inclined downwardly away from said tracks, said hopper having a bottom wall provided with lengthwise slots opening through one end thereof and disposed to deliver articles therein to said tracks when said hopper is in its said first position, a gate adjacent said one end of said hopper yieldingly urged toward said bottom wall and closed in the movement of said hopper from an intermediate position to its said first position, said gate having therein notches disposed in its closed position to straddle said slots, and means limiting downward movement of said gate in the downward movement of said hopper whereby said gate remains open with its bottom spaced from the bottom wall of said hopper when the latter is moved to its said lower position.

3. In feed hopper means of the character described, inclined article receiving reserve tracks, a hopper mounted at one end adjacent the upper end of said tracks for oscillatory movement about a substantially horizontal axis, means for oscillating said hopper effective for moving it to an upper position and a lower position in which it is respectively inclined downwardly toward and away from said tracks, said hopper having a bottom wall provided with lengthwise slots opening through its track end substantially in register with said tracks, a gate at said one end of said hopper movable relative thereto and yieldingly urged closed toward said bottom wall, and means limiting downward movement of said gate in the downward movement of said hopper whereby said gate remains open with its bottom spaced from the bottom wall of said hopper when the latter is moved to its said lower position, said gate being provided with notches disposed to straddle said slots in the upward movement of said gate with said bottom wall.

4. In feed hopper means of the character described, a mounting bracket, inclined article reserve tracks carried by said bracket, a hopper pivoted at one end on said bracket adjacent the upper end of said tracks for oscillatory movement about a substantially horizontal axis, means for oscillating said hopper effective for moving it to an upper position and a lower position in which it is respectively inclined downwardly toward and away from said tracks, said hopper having a bottom wall provided with lengthwise slots opening through its track end and substantially in register with said tracks, a gate at the track end of said hopper yieldingly urged closed toward said bottom wall, and means limiting downward movement of said gate in the downward movement of said hopper whereby said gate remains open with its bottom spaced from the bottom wall of said hopper when the latter is moved to its said lower position, said gate being provided with notches disposed to straddle said slots when said gate is closed.

5. In feed hopper means of the character described, a mounting bracket, an inclined article reserve track carried by said bracket, a hopper pivoted at one end on said bracket adjacent the upper end of said track for oscillatory movement about a substantially horizontal axis, means for oscillating said hopper effective for moving it to an upper position and a lower position in which it is respectively inclined downwardly toward and away from said track, said hopper being substantially oblong in plan and having side and end walls and a bottom wall, said bottom wall being provided with a lengthwise slot opening through its track end and substantially in register with said track, the track end wall of said hopper being spaced above said bottom wall at the area of said slot, a gate pivoted on a horizontal axis adjacent the track end wall of said hopper overlying said slot and yieldingly urged closed toward said bottom wall, said gate having therein a notch straddling said slot when said gate is closed, and means limiting movement of said gate toward said bottom wall in the downward movement of said hopper whereby said gate remains open with its bottom spaced from the bottom wall of said hopper when the latter is moved to its said lower position.

6. In feed hopper means of the character described, a mounting bracket, an inclined article reserve track, a hopper substantially oblong in plan having side and end walls and a bottom wall, one end wall of said hopper being spaced above said bottom wall and the latter having a lengthwise slot opening through the end thereof adjacent said one end wall, a gate between said one end wall and said bottom wall, common means pivotally mounting said hopper adjacent said one end wall thereof and said gate in said bracket for oscillatory movement about a substantially horizontal axis with the open end of said slot substantially in register with said track, said gate being yieldingly urged closed toward said bottom wall, means for oscillating said hopper effective for moving it to an upper position and a lower position in which it is respectively inclined downwardly toward and away from said track, and means limiting movement of said gate toward said bottom wall in the downward movement of said hopper whereby said gate remains open with its bottom spaced from the bottom wall of said hopper when the latter is in its said lower position, said gate having therein a notch straddling said slot when said gate is closed.

7. In feed hopper means of the character described, an inclined article reserve track, a hopper mounted adjacent the upper end of said track for oscillatory movement about a horizontal axis to an upper position and a lower position in which it is respectively inclined downwardly toward and away from said track, said hopper having a bottom wall provided with a lengthwise slot opening through its track end, guide strips mounted on the upper face of said bottom wall alongside said slot and adjustable toward and away from each other in overlying relation to said slot, said strips extending approximately to the upper end of said track, and means providing for delivery of articles from said slot and strips to said track comprising a gate adjacent the track end of said hopper yieldingly urged closed toward said bottom wall, and means limiting movement of said gate toward said bottom wall in the downward movement of said hopper whereby said gate remains open with its bottom spaced from the bottom wall of said hopper when the latter is in its said lower position, said gate having therein a notch straddling said slot when said gate is closed.

8. In feed hopper means of the character described, a hopper adapted to be pivoted at one end for oscillatory movement about a horizontal axis to an upper position and a lower position in which it is respectively inclined downwardly toward and away from said axis, said hopper having a bottom wall provided with a lengthwise slot opening through the end thereof at said one end of said hopper, and means for delivering articles from said slot through said open end thereof comprising a gate at said one end of said hopper yieldingly urged closed toward said bottom wall, and means for limiting movement of said gate toward said bottom wall in the downward movement of said hopper whereby said gate remains open with its bottom spaced from the bottom wall of said hopper when the latter is in its said lower position, said gate having therein a notch straddling said slot when said gate is closed.

9. In feed hopper means of the character described, a hopper adapted to be pivoted at one end for oscillatory movement about a horizontal axis to an upper position and a lower position in which it is respectively inclined downwardly toward and away from said axis, said hopper having a bottom wall provided with a lengthwise slot opening through the end thereof at said one end of said hopper, and means for delivering articles from said slot through said open end thereof comprising a gate at said one end of said hopper providing an end closure wall therefor and yieldingly urged closed toward said bottom wall, and means for limiting movement of said gate toward said bottom wall in the downward movement of said hopper whereby said gate remains open with its bottom spaced from the bottom wall of said hopper when the latter is in its said lower position, said gate having therein a notch straddling said slot when said gate is closed.

10. In feed hopper means for the character described, a hopper adapted to be pivoted at one end for oscillatory movement about a horizontal axis to an upper position and a lower position in which it is respectively inclined downwardly toward and away from said axis, said hopper being substantially oblong in plan and having side walls, an end wall at the other end thereof and a bottom wall, said bottom wall being provided with a lengthwise slot opening through the end thereof at said one end of said hopper, means for delivering articles from said slot through said open end thereof comprising a gate slidably mounted between said side walls at said one end of said hopper for movement toward and away from said bottom wall and yieldingly urged closed toward the latter, and means for limiting movement of said gate toward said bottom wall in the downward movement of said hopper whereby said gate remains open with its bottom spaced from the bottom wall of said hopper when the latter is in its said lower position, said gate constituting an end closure wall for said hopper and being provided with a notch disposed to straddle said slot when said gate is closed.

11. In feed hopper means of the character described, a hopper adapted to be pivoted at one end for oscillatory movement about a horizontal axis to an upper position and a lower position in which it is respectively inclined downwardly toward and away from said axis, said hopper being substantially oblong in plan and having side walls, an end wall at the other end thereof and a bottom wall, said bottom wall being provided with a lengthwise slot opening through the end thereof at said one end of said hopper, means for delivering articles from said slot through said open end thereof comprising a gate pivoted adjacent its top between said side walls at said one end of said hopper for movement toward and away from said bottom wall in the downward and upward movements of said hopper, said gate being closed with its lower edge adjacent said bottom wall when said hopper is at or above horizontal position and open with its lower edge spaced a material distance above said bottom wall when said hopper is in its said lower position, said gate constituting an end closure wall for said hopper and having therein a notch straddling said slot when said gate is closed.

12. In feed hopper means of the character described, a hopper adapted to be pivoted at one end for oscillatory movement about a horizontal axis to an upper position and a lower position in which it is respectively inclined downwardly toward and away from said axis, said hopper being substantially oblong in plan and having side walls, an end wall at the other end thereof and a bottom wall, said bottom wall being provided with a lengthwise slot opening through the end thereof at said one end of said hopper, and means for delivering articles from said slot through said open end thereof comprising a gate at said one end of said hopper pivoted between said side walls for movement toward and away from said bottom wall in the downward and upward movements of said hopper, said gate being closed with its lower edge adjacent said bottom wall when said hopper is in or above horizontal position and open with its lower edge spaced a material distance above said bottom wall when said hopper is in its said lower position, said gate constituting an end closure wall for said hopper and having therein a notch straddling said slot when said gate is closed.

13. In hopper feed means of the character described, a hopper pivoted at one end for oscillatory movement about a horizontal axis to an upper position and a lower position in which it is respectively inclined downwardly toward and away from said axis, said hopper being substantially oblong in plan and comprising side walls, end walls and a bottom wall, said bottom wall being provided with lengthwise slots opening through the end thereof at said one end of said hopper, the end wall at said one end of said hopper being spaced above said bottom wall, and a gate of arcuate cross section below said one end wall pivoted between said side walls for movement toward and away from said bottom wall, said gate being reversible and having in each side thereof notches disposed to straddle said slots when either side of said gate is disposed adjacent said bottom wall, means yieldingly urging said gate closed toward said bottom wall, and means limiting movement of said gate toward said bottom wall in the downward movement of said hopper whereby said gate remains open with its bottom spaced from the bottom wall of said hopper when the latter is in its said lower position.

14. In hopper feed means of the character described, a hopper pivoted at one end for oscillatory movement about a horizontal axis to an upper position and a lower position in which it is respectively inclined downwardly toward and away from said axis, said hopper being substantially oblong in plan and comprising side walls, end walls and a bottom wall, said bottom wall being provided with lengthwise slots opening through the end thereof at said one end of said hopper, the end wall at said one end of said hopper being spaced above said bottom wall, and a gate of arcuate cross section below said one end wall pivoted between said side walls for movement toward and away from said bottom wall, said gate having in one side thereof notches disposed to straddle said slots when said gate is closed with said one side thereof adjacent said bottom wall, means yieldingly urging said gate closed toward said bottom wall, means limiting movement of said gate toward said bottom wall in the downward movement of said hopper whereby said gate remains open with said one side thereof spaced from the bottom wall of said hopper when the latter is in its said lower position, and a plate on said gate adjustable lengthwise thereof with one side edge substantially in the plane of the lower edge of said one side of said gate, said plate being provided with two sets of notches extending from its lower edge respectively alignable with the notches of said gate by adjustment of said plate.

BATES C. COOK.
JOHN JOKUBONIS.

No references cited.